US005787219A

United States Patent [19]

Mueller et al.

[11] Patent Number: 5,787,219

[45] Date of Patent: Jul. 28, 1998

[54] CABLE CLOSURE

[75] Inventors: Thorsten Mueller, Menden, Germany; Andreas Guenther, Fort Worth, Tex.; Rainer Zimmer, Schalksmuehle, Germany

[73] Assignee: Siemens Aktiengesellschaft, Munich, Germany

[21] Appl. No.: 822,608

[22] Filed: Mar. 19, 1997

[30] Foreign Application Priority Data

Mar. 20, 1996 [DE] Germany ........................ 196 11 020.3

[51] Int. Cl.[6] ........................ G02B 6/38

[52] U.S. Cl. ........................ 385/134; 385/135; 385/138

[58] Field of Search ........................ 385/134, 135, 385/136, 137, 138

[56] References Cited

U.S. PATENT DOCUMENTS 5,341,451 8/1994 Latte et al. ........................ 385/135
5,668,911 9/1997 Debortoli ........................ 385/135
5,689,605 11/1997 Cobb et al. ........................ 385/135
5,708,751 1/1998 Mattei ........................ 385/135

FOREIGN PATENT DOCUMENTS 0 579 019 1/1994 European Pat. Off. .

*Primary Examiner*—John Ngo
*Attorney, Agent, or Firm*—Hill & Simpson

[57] ABSTRACT

A cable closure for receiving electrical or optical splices has a lower shell and a cover and at least one end face of the lower shell has a fixed part and a removable sealing part. The lead-in openings are formed in a separating plane or line between the fixed part and the sealing element, and the lower shell and cover are connected to each other along one side by a hinge and fastening elements are located on the opposite longitudinal side of the closure. The cable closure includes cable-clamping devices for the cable sheath and clamping devices for central elements of the optical fiber cables.

27 Claims, 15 Drawing Sheets

18
68
5b
5a
5b
5a
5
1

1
2
2a
3
4
5
6
6
6
7
7b
8
16
17a
17b
29a
68

5a
2
12
15
4
8
4
14
11
13
9
10
7a
69
68
2a 3
5b
16
17a 3
2
19
5b
5c
5
15
5a
5d 5a
20
15
21
2

7
4
4
22
22
14'
23
24
24
25

28
7'
4

37
38
36
34
36a
40
71
39
31
33
41

45
43
42
32
44
44

56
64
58
60
59
61
66
61
62
65
63
57

CABLE CLOSURE

BACKGROUND OF THE INVENTION

The present invention is directed to a cable closure for receiving electrical or optical splices, which closure comprises a cover, a lower shell and at least one end face of the lower shell having a fixed part and a removable sealing element, so that cable lead-in openings are arranged in a separating plane between the fixed part and the sealing element.

U.S. Pat. No. 5,341,451, whose disclosure is incorporated herein by reference thereto and which claims priority from the same German Application as European Published Application 0 579 019 A1, discloses a cable closure for depositing splice organizers for optical waveguides. Each of the splice organizers is provided with a separate receptacle for excess lengths of the optical waveguide conductors. The splice organizer and receptacle for the splice organizer are arranged, in each case, on a carrier plate and are held in a fixed device. Each carrier plate can be removed individually from the fixing arrangement, without at the same time having to move the other carrier plates out of their position. The lower shell of this cable closure comprises, on the end face, a fixed part, onto which a sealing element can be fitted. The cable lead-ins are arranged between the fixed part and the sealing element.

SUMMARY OF THE INVENTION

An object of the present invention is to provide a cable closure which is suitable for receiving both electrical and optical splices, and it is intended to make it possible for these splices to be accessible without the cable lead-in seals being damaged.

Closures on the market up until now have been designed only either for splices of copper cables or for optical fiber cables and can usually only be retrofitted with considerable effort. Access to the splice is usually difficult and has the effect that the seals in the cable leadins are destroyed. The advantage of the cable closure of the present invention is essentially that this cable closure can be used for receiving both copper splices and optical fiber cable splices with the associated special requirements, in particular accommodating excess lengths of the optical waveguides.

The cable closure according to the present invention comprises a cover and a lower shell, the end faces of which, in each case, are formed by a fixedly molded-on fixed part and an insertable sealing element. The cover and lower shell are attached on one side, so that the cover can be swung relative to the lower shell by at least one hinge. With the aid of the fastening elements, the cover, after closing, is pressed into place in a sealed manner by means of fastening elements on the opposite side. The inserted sealing elements in the end face are, in this case, fixed in such a way that they form with the upper edge of the lower shell a continuous sealing plane, which may have a peripheral groove in which sealing material can be placed. The sealing material can consist of an elastic or plastic material and, consequently, makes it possible for the cover to be opened whenever desired, so that rapid access to the splice compartment is possible without impairing the seals in the lead-in openings.

The lower shell of the cable closure preferably consists of a thermoplastic material, for example a polypropylene. Along one edge, in the region of the separating plane between the lower shell and the cover, there are hinge elements fixedly molded on the shell, which hinge elements are designed in such a way that corresponding hinge elements along one edge of the cover can be engaged. In this way, it is possible that the cover can be fastened to the lower shell so that it can be swung open and so that it can be removed, if need be. Arranged along the two opposite edges of the lower shell and of the cover are attachments for the captive fitting or fastening elements. Serving as fastening elements are, in particular, clamping hooks of reinforced plastic together with wire clips. The wire clips are, in this case, captively connected to the clamping hooks, which are likewise captively snap-fitted onto the attachments of the lower shell. These clamping hooks fit exactly in the outer contour of the cable closure and consequently form a smooth transition in the form of the housing, so that unwanted opening due to protruding edges and opening by hand are prevented or made more difficult. For reopening the closure on the clamping hooks, there are provided, for example, slots into which, for example, a screwdriver can be inserted. This inserted screwdriver serves as a lever, by which the clamping hooks can be levered or pivoted out of engagement. As already described, the integrated hinge is divided into two halves and can be firmly connected together by engaging of the two halves. In this case, the hinge is designed in such a way that, in a specific pivoted position, the halves can be separated again, so that the cover can be taken off, if need be. By appropriate design, for example by widening the outer hinge legs, fitting the cover in the wrong way on the lower shell is ruled out.

The cover of the cable closure likewise consists of a thermoplastic material, for example polypropylene. On the fastening side, along the edge, there are attachments, for example in the form of depressions, into which the fastening elements are fitted, with the fastening elements engaging behind the edges of these depressions. These undercut depressions as attachments for the fastening elements are designed in such a way that they positively lock the closure in such a way that the fastening elements do not protrude. On the upper side of the cover, there is also arranged, for example, a blind hole with a base which can be opened, into which hole there can be fitted, for example, a valve, once the base has been opened. It can also be used, however, as a filling opening, for example, for introducing commercially-available filling compounds into the closure. In addition, molded onto the interior are ribs, between which there can also be inserted, for example, a limiting piece, so that this makes it possible to create a hosing block or core block, for example of cast resin. Furthermore, at the ends of the cover and of the lower shell, there may be arranged congruent bores for applying lead seals.

As already described, at least one of the upper faces of the lower shell of the cable closure comprises a fixedly molded-on fixed part with a recess for receiving an insertable sealing element, and the two parts complement each other in such a way that a continuous, stepless separating surface with respect to the cover is obtained at the upper edge of the lower shell. Cable lead-in openings are introduced in the separating plane between the fixed part and the sealing element, so that even uncut cables can be led in without any problem. Elastic or plastic sealing material is placed in the cable lead-in openings and in the separating plane between the fixed part and the sealing element. Subsequently, the sealing element is fixed on the fixed part. Consequently, the cable lead-in plane is not identical to the separating plane between the lower shell and the cover so that the cable closure can be opened at any time without the cable lead-in seals being damaged.

The sealing elements may be designed, for example, in a wedge-shaped manner on the two marginal sides, so that, with the recess in the fixed part having a corresponding, likewise wedge-shaped, design, there is mutual centering when the sealing element is fitted into the recess. The sealing element is preferably fixed in the recess of the fixed part by tapping screws. The sealing element preferably has, on the side facing the fixed part and protruding at the outer and inner edges, lamellae, which serve as limiting stops when fixing the sealing element in the recess of the fixed part. This ensures that the inserted seal is adequately compressed and, at the same time, ensures dimensionally accurate termination in the separating plane toward the cover. This always produces a uniform transition without any step in the separating plane of the lower shell. There are also lamellae arranged in the fixed part and in the sealing element, and these lamellae lie one behind the other in the axial direction and preferably are provided additionally with V grooves. In this way, better pressing of the sealing material is achieved.

Preferably, the fixed part is provided in the lower shell with an outer lamella and an inner lamella, which together form a chamber that serves for receiving a part of the sealing element. In this way, satisfactory mounting of the sealing element in the axial direction is obtained, so that axial displacement is ruled out. In addition, on the sealing element, there may be provided lateral grooves, into which correspondingly arranged tongues or flanges of the lower shell engage, so that, furthermore, accurately fitting and torsionally secure positioning in the lower shell is obtained.

On the sealing element, there may also be provided corresponding attachments, bores or securing means, in or on which further closure elements, such as, for example, securing means for excess lengths of optical waveguides, are mounted. In addition, the sealing elements may also be provided with special inlets, such as, for example, with a lead-in spigot or a gland. In this way, additional cables can then also be led into the closure at a later time without impairing already installed cables. The sealing element preferably, likewise, consists of a thermoplastic material, such as, for example, polypropylene, and it is possible, for example in the case of embodiments with a cable lead-in spigot, additionally to use pieces of shrink-fit tube.

Adjacent the sealing regions in the cable lead-ins, are directly mounted cable-clamping devices. For this purpose, these are arranged adjoining the recess in the fixed part in the lower shell, for example, receiving elements for fixing cable-clamping devices in the interior of the cable closure. Here, too, by forming appropriate lamellae, the chambers are formed, into which the cable-clamping elements or devices are anchored in an axial direction and, if need be, with appropriate arresting means also in a torsionally secure manner. Various clamping principles are used for this purpose, for example cable clamping by clamping a cable sheath lug or by clamping the cable sheath over its entire circumference. Several exemplary embodiments of this type are specified with reference to the corresponding Figures.

The led-in cables are sealed in the cable lead-ins with the aid of plastic sealing compound by wrapping onto the cable or with the aid of a correspondingly shaped sealing piece, in particular in the case of multiple lead-ins. The lower shell is sealed with respect to the cover, preferably by an elastic seal, so that reusability when the closure is opened is obtained. For a better function, however, the seal, which may be a continuous ring, may also be designed as a combination seal, that is to say a seal comprising an elastic part and a plastic part.

On the basis of this already-described basic equipment and the special basic equipment for the needs of an optical waveguide closure, the cable closure according to the present invention can be used universally. For example, arranged on the longitudinal sides of the lower shell in the interior, there are receiving grooves, which are undercuts, for example, for the variable push-in of splice organizer holders. Furthermore, pockets for inserting various cable-clamping means are provided at the end faces, and it is possible to use, here, cableclamping devices modified specifically for the clamping of optical fiber cables. In addition, receiving points for fixing further optical waveguide components, for example a central element or a central pipe, are already provided in the interior. Furthermore, the underside of the shell is provided with fastening points for screwing on wall, mast or messenger-wire fastening means. These fastening points are respectively provided in the form of blind holes and may be broken through with self-tapping screws. For this purpose, molded-in threaded inserts may also be provided on the outside.

If the cable closure according to the present invention is used in an optical waveguide closure, it is to be regarded as a basic principle that two levels are created, the lower level essentially being used for depositing the excess length of the optical waveguide, while the upper level is used for arranging the splice organizers. For the clear arrangement of the optical splice organizers, an organizer holder is used, which is mounted by corresponding securing means in the laterally arranged grooves of the lower shell. The organizer holder preferably comprises a plurality of individual elements, which can be plugged together, and a terminating plate, so that it can be mounted together according to the individual number of organizers. Pushed onto the rear side of the elements is a hinge with fastening legs, which are pushed into the above-mentioned integrated grooves of the lower shell. By means of the hinge, the organizer holder can be swung away during installation so that there is full access to the excess lengths of the optical waveguides on the first level. Attached to the fastening legs are preferably downwardly-directed hooks so that the excess lengths of an optical waveguide are held back and do not spring up into the upper splice compartment. Such hooks may be fitted all around in the lower shell as optical waveguide hold-down devices. In addition, suitable clamping elements for clamping the central elements or central pipes of optical fiber cables may be arranged in the lower shell.

Other advantages and features of the invention will be readily apparent from the following description of the preferred embodiments, the drawings and claims.

DESCRIPTION OF THE PREFERRED EMBODIMENTS

Figure 1:
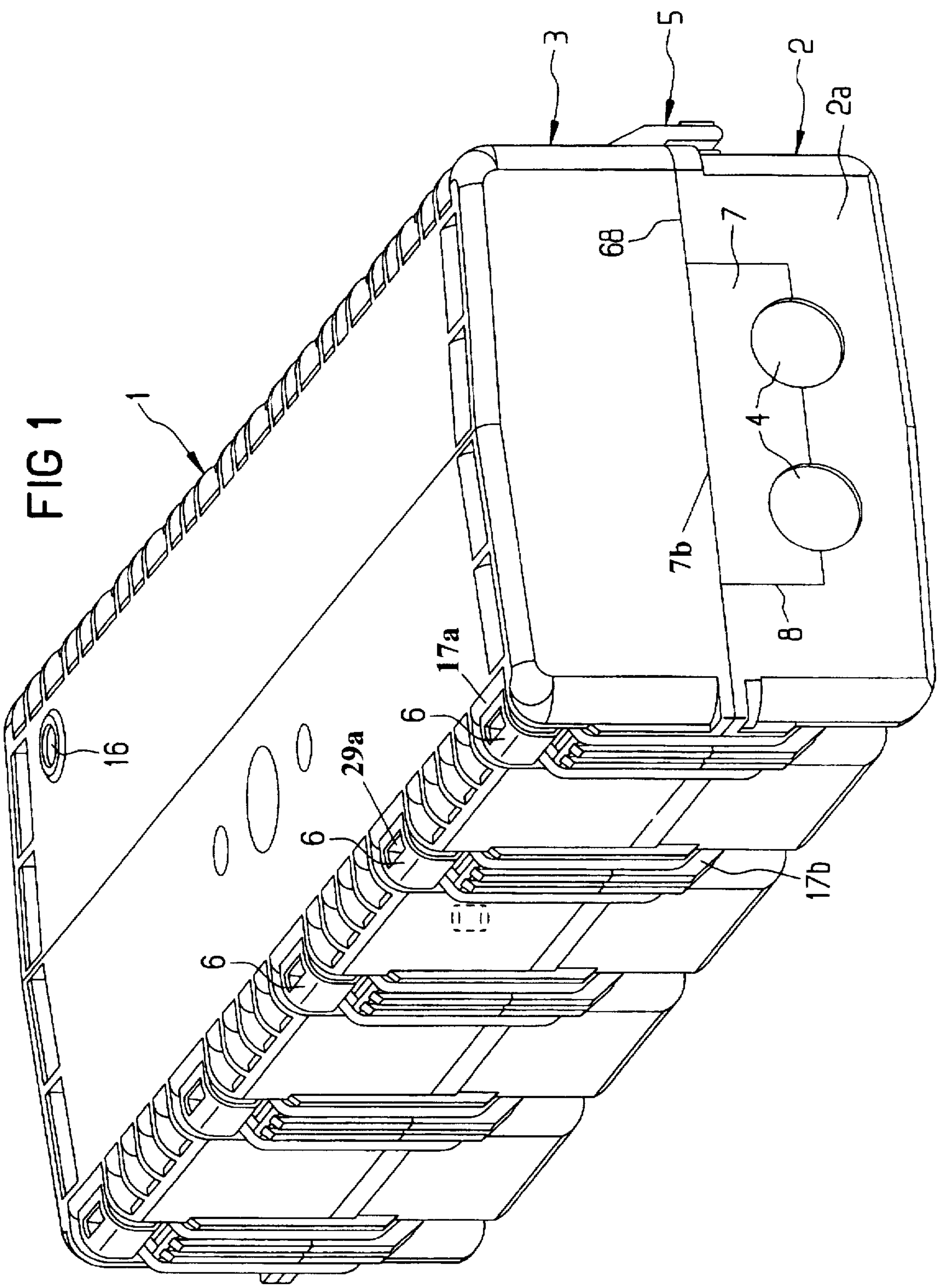
FIG. 1 is a perspective view of a closed cable closure in accordance with the present invention.

The principles of the present invention are particularly useful when incorporated in a cable closure, generally indicated at 1 in FIG. 1, which device is illustrated in a closed state. The closure 1 has a lower shell 2 and an upper shell or cover 3, which are joined together along a separating plane 68. The cover 3 is attached on one side to the lower shell 2 by a hinge 5. Opposite the side having the hinge 5 are fastening elements 6, which are captively engaged in corresponding attachments or hooks **17*b* on the lower shell 2 and attachments 17*a* on the cover 3, respectively. The lower shell 2 on an end 2*a* is provided with a sealing element 7, which is inserted in a cutout opening or recess having an opening surface 8. As illustrated, an upper surface or edge 7*b* of the sealing element 7 terminates steplessly with respect to an upper edge of the shell 2 so that the upper edge 7*a* of the sealing element 7 is on the separating plane 68 between the lid or cover 3 and the lower shell 2. The upper shell or cover 3 is provided with openings, such as 16**, which are blind holes, which may be provided for possible lead-throughs or filling openings.

Figure 2:
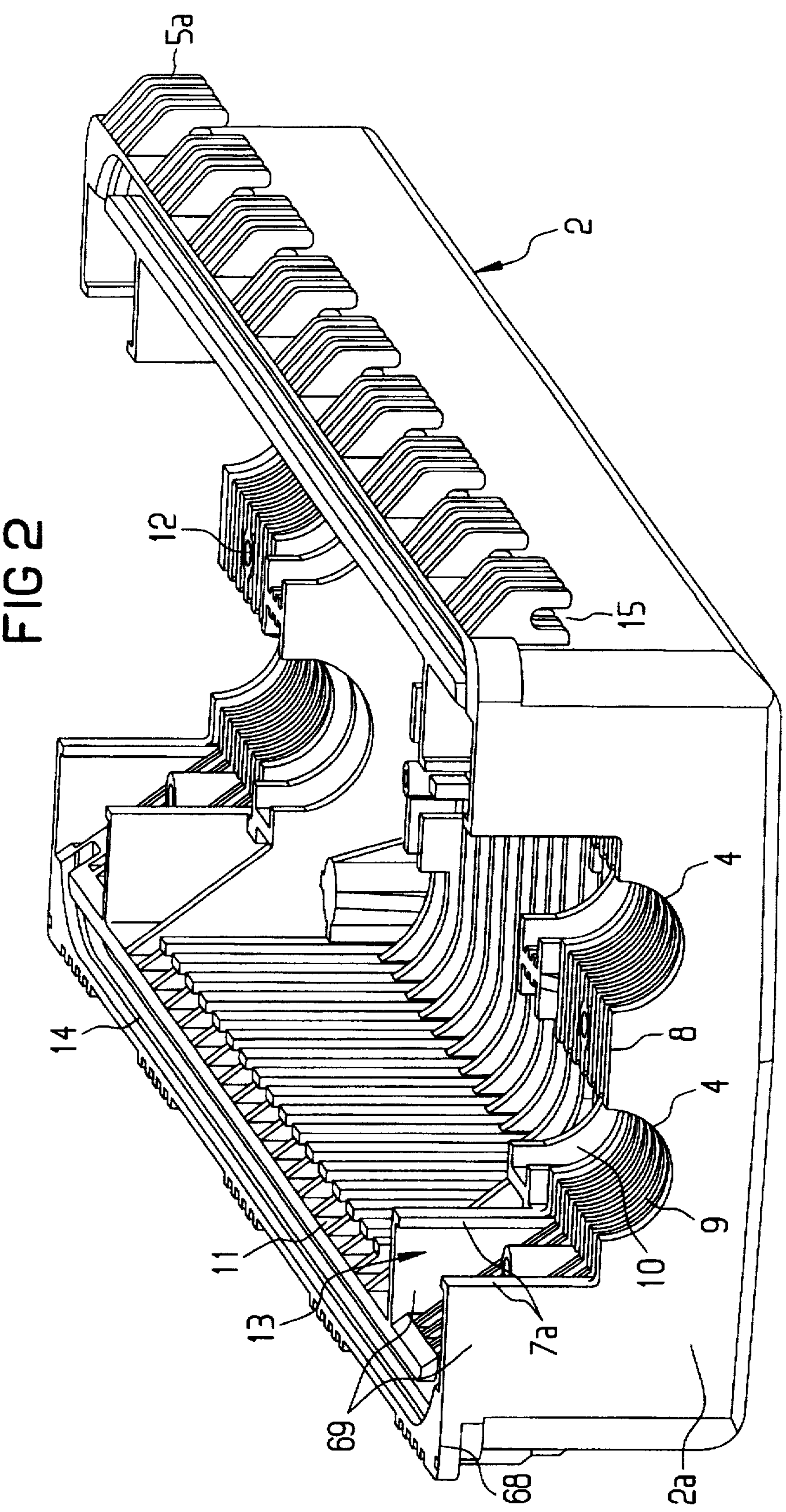
FIG. 2 is a perspective view of the lower shell of the cable closure of FIG. 1.

As illustrated in FIG. 2, the lower shell 2 is in the opened state of the cable closure with the cover removed. There is provided along the right-hand longitudinal side of the lower shell a plurality of attachments **5*a* forming a hinge portion for receiving a hinge portion of the cover. Each of these attachments 5*a* have an opening in which the corresponding element of the cover will be hooked. In the end face 2*a* of the shell 2, the sealing element 7 has been removed, so that a profile of the entry region is visible. This reveals that the end face comprises lamellae 9 lying one behind the other, so that it is possible for the sealing compound placed on the lamellae to be displaced in a manner corresponding to the sealing pressures into the cavities lying in between the lamellae. It can be seen here that on both sides of the cutout or recess marked by the separating plane 8, an inner and an outer lamella 69 are formed, as far as the upper edge and thereby form a chamber 13 on both sides. A portion or part of the sealing element 7 is inserted into this chamber so that a position of the element 7** can be definitely fixed.

The lateral wall of the chamber 13 slopes, preferably widening the chamber upwardly in a wedge-shaped manner, and the sealing element 7, likewise adapted in a wedge-shaped manner, can be definitely mounted. The sealing element 7 is preferably fixed in the lower shell by means of tapping screws. Furthermore, it can be seen here that adjacent the sealing region is a receiving chamber 10 for cable gripping or clamping elements. The clamping elements or devices for the cable sheath of the led-in cable are fitted into these receiving chambers 10, as will be explained hereinafter. In the inner space of the lower shell 9 there can be seen various designs of ribs, which, on the one hand, serve for reinforcing the lower shell, but also, on the other hand, are designed in such a way that they are used for further functions. For example, the ribs on the side walls of the lower shell 2 are designed in such a way that undercut grooves 11 are formed. Then, corresponding additional parts, such as, for example, splice holders or hold-down devices for optical waveguide conductors, can be mounted in these undercut grooves and fixed in the device. The design of the inner space ensures a universal use of the cable closure for traditional copper-wire cables and for optical fiber cables. The openings 12 serve for insertion of screws, by which the sealing element 7 is respectively fixed in the recess. In the central region of the sealing plane, there is arranged a pressing area for reopening the sealing element. This involves screwing a screw into a corresponding opening of the sealing element 7, and the screw presses against the pressing area and, thus, raises the sealing element 7. A metal insert may also be pressed in here. Finally, the shell 2 has a sealing groove 14, into which is preferably introduced an elastic seal, which allows repeated opening of the cable closure without having the effect of destroying it. At the end faces, the sealing groove 14 merges steplessly into a sealing groove 14' of the sealing element 7 once the sealing element has been mounted in the recess in the end face of the lower shell 2.

Figure 3:
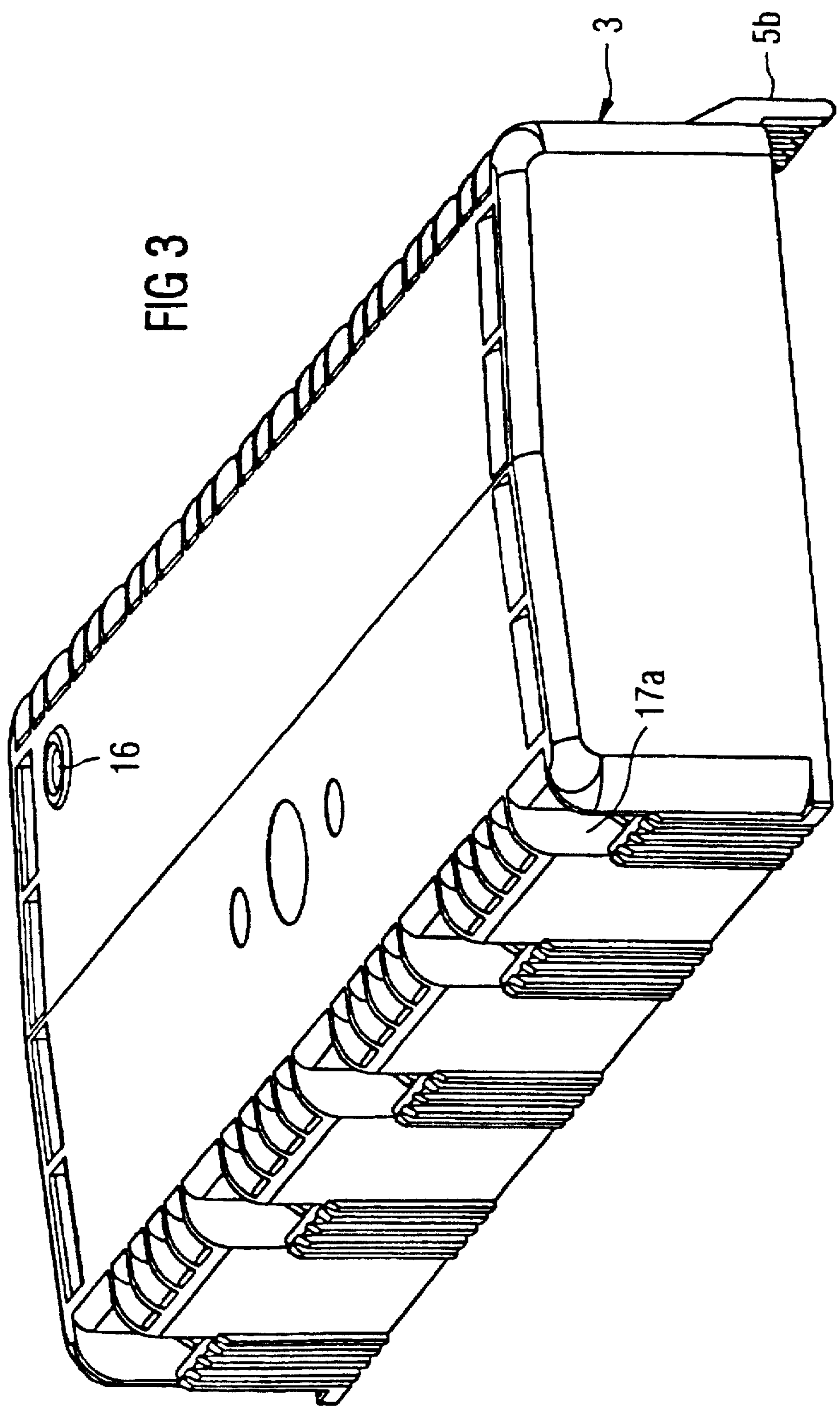
FIG. 3 is a perspective view of the cover of the cable closure of FIG. 1.

FIG. 3 shows the cover 3 of the cable closure, preferably the side having the attachments **17*a*, which are recesses for the fastening elements. The fastening elements are captively engaged in these recesses 17*a*, and the outer ribs adjacent the recesses are designed as protection against unintended opening of the holding elements. On the right-hand side of the cover 3, the hinge elements 5*b*** corresponding to the lower shells can be seen.

Figure 4:
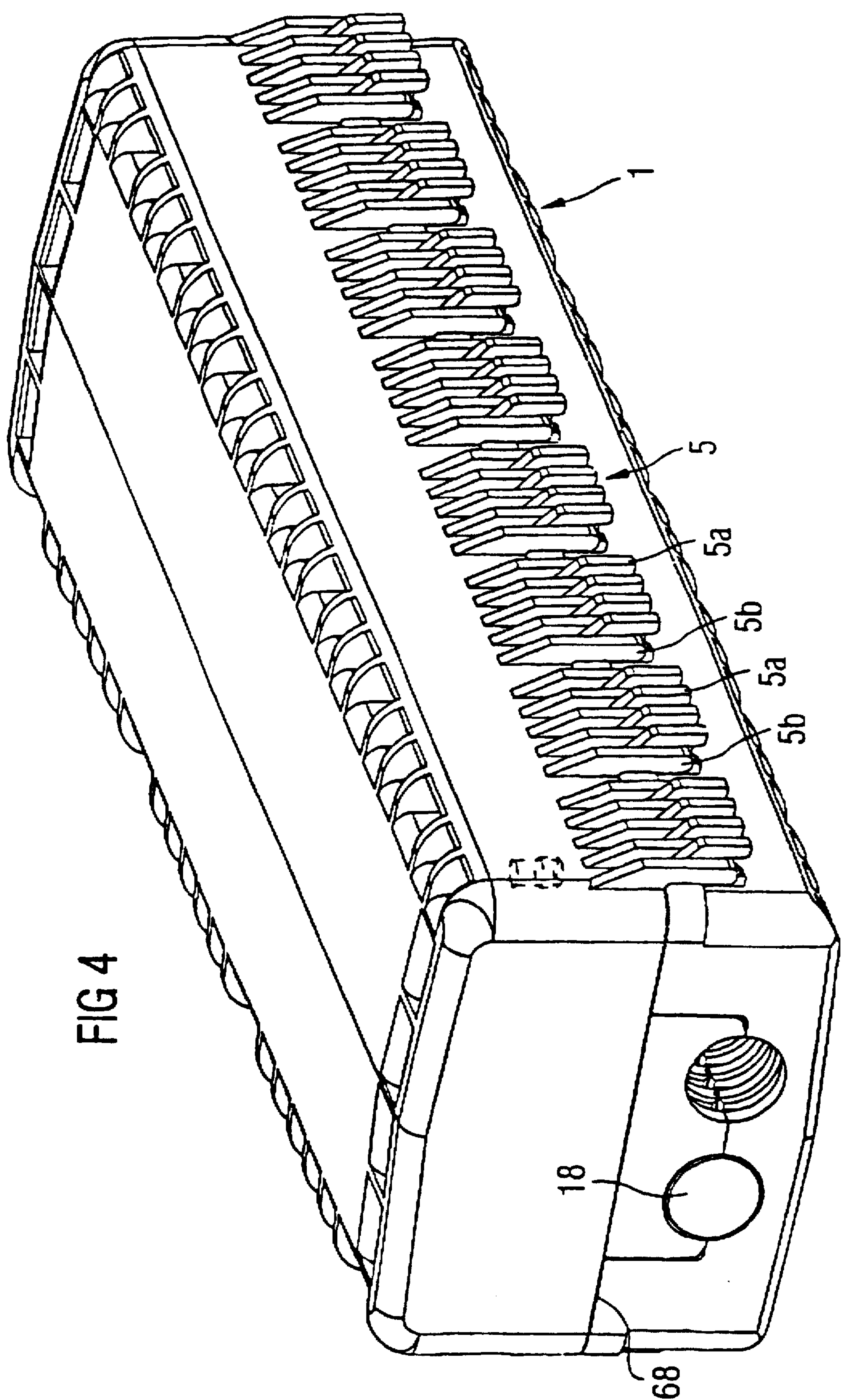
FIG. 4 is a perspective view of the closed cable closure viewed along the hinged side of the cover and shell.

FIG. 4 shows the cable closure 1 looking at the hinge side, with the hinge 5 being formed by the hinge elements **5*a* and 5*b*. The hinge elements 5*a* of the lower shell 2 are open downward in a slot-shaped manner, and the corresponding hinge elements 5*b* of the cover are inserted into these slots in an engaging manner. The design of the hinge 5 is conceived in such a way that the cover can be arrested in the open state. In addition, the engagement can be overcome in a specific position, so that the cover can be easily removed, for example in the case of installation work. In this representation, the sealing elements are fixed in the end face and one cable lead-in opening is closed by a dummy plug 18**.

Figure 5:
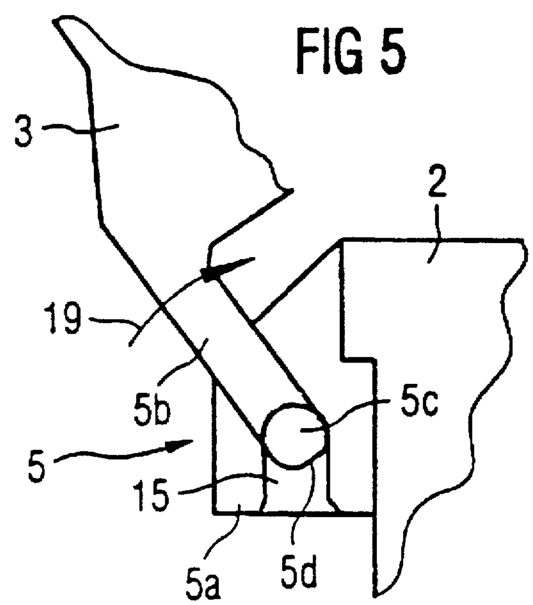
FIG. 5 is an enlarged side view of the hinge.
Figure 6:
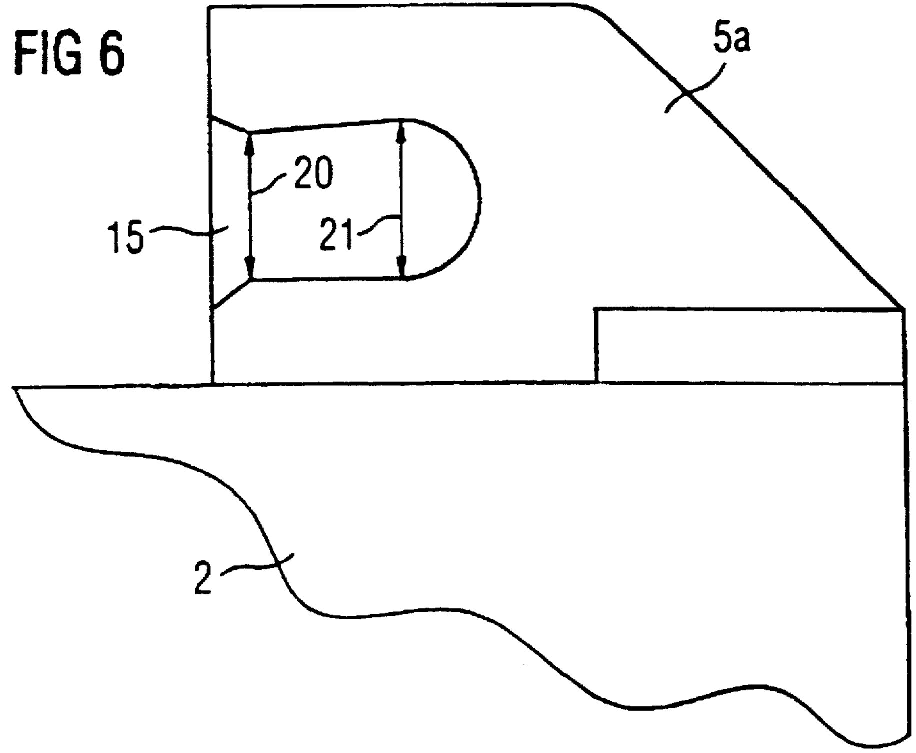
FIG. 6 is an enlarged view of a portion of the hinge element on the lower shell.

The relationship of the hinge elements **5*a* and 5*b* is shown in FIGS. 5 and 6. The design of the hinge element 5*b* of the cover 3 has on its end a spindle 5*c*, which is inserted from below into the slot 15 of the hinge element 5*a*. It should be noted that the spindle 5*c* has, on its circumference, a flattened portion 5*d*. The arrow 19 indicates the pivoting direction for the cover 3**.

As best illustrated in FIG. 6, the slot 15 of the hinge **5*a* on the lower shell 2 has a circular-shaped end, and this has a radius 21 which corresponds to the radius of the spindle 5*c*. However, the opening 15 has a narrow mouth of a distance 20, which is less than the radius 21. The distance 20 corresponds, however, to the distance of the spindle 5*c* extending perpendicular to the flat portion 5*d*. It is thus possible that the corresponding hinge element of the cover can be inserted only when the cover 3 has been swung in such a way that because of the flattened portion 5d, the spindle 5c can be fed through the narrow mouth or slot entrance having the dimension shown by the arrow 20**.

Figure 7:
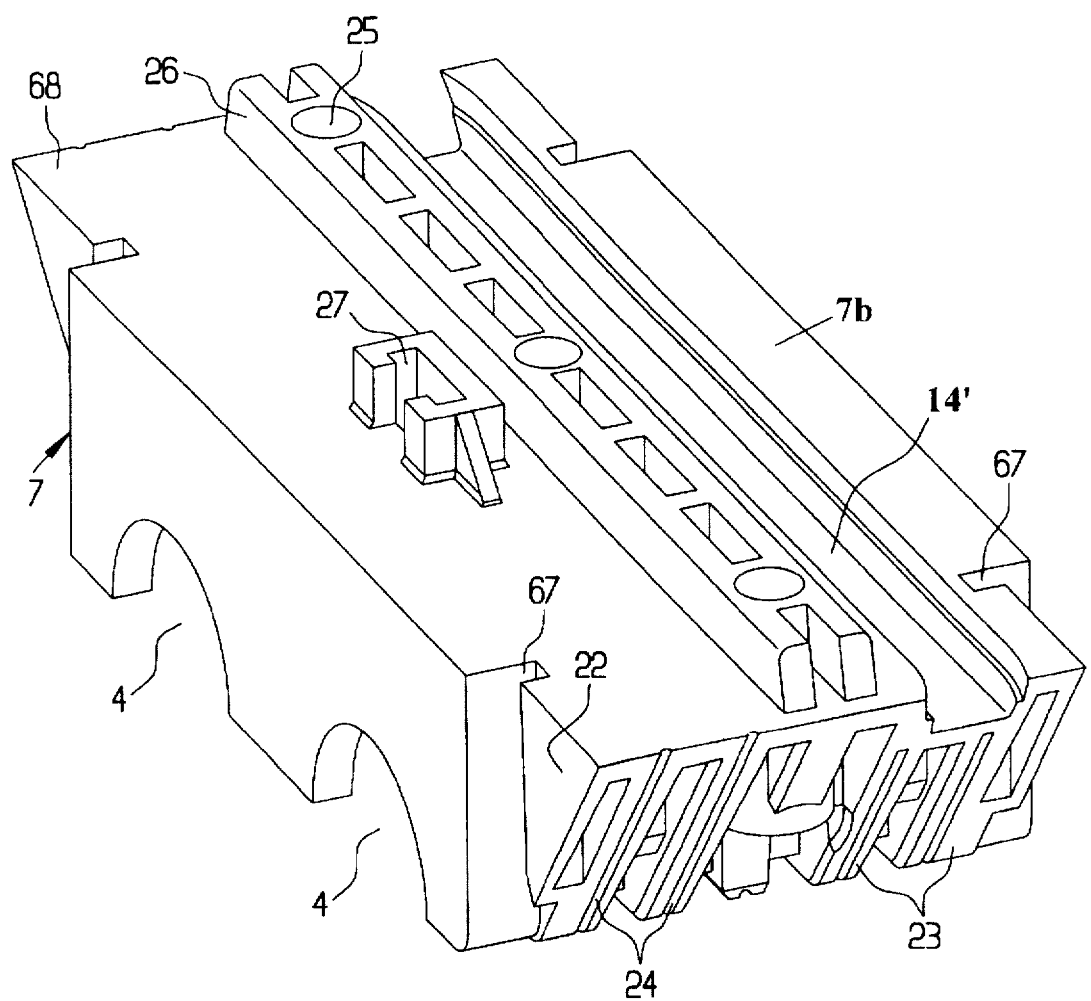
FIG. 7 is a top perspective view of a sealing element for the present invention.
Figure 8:
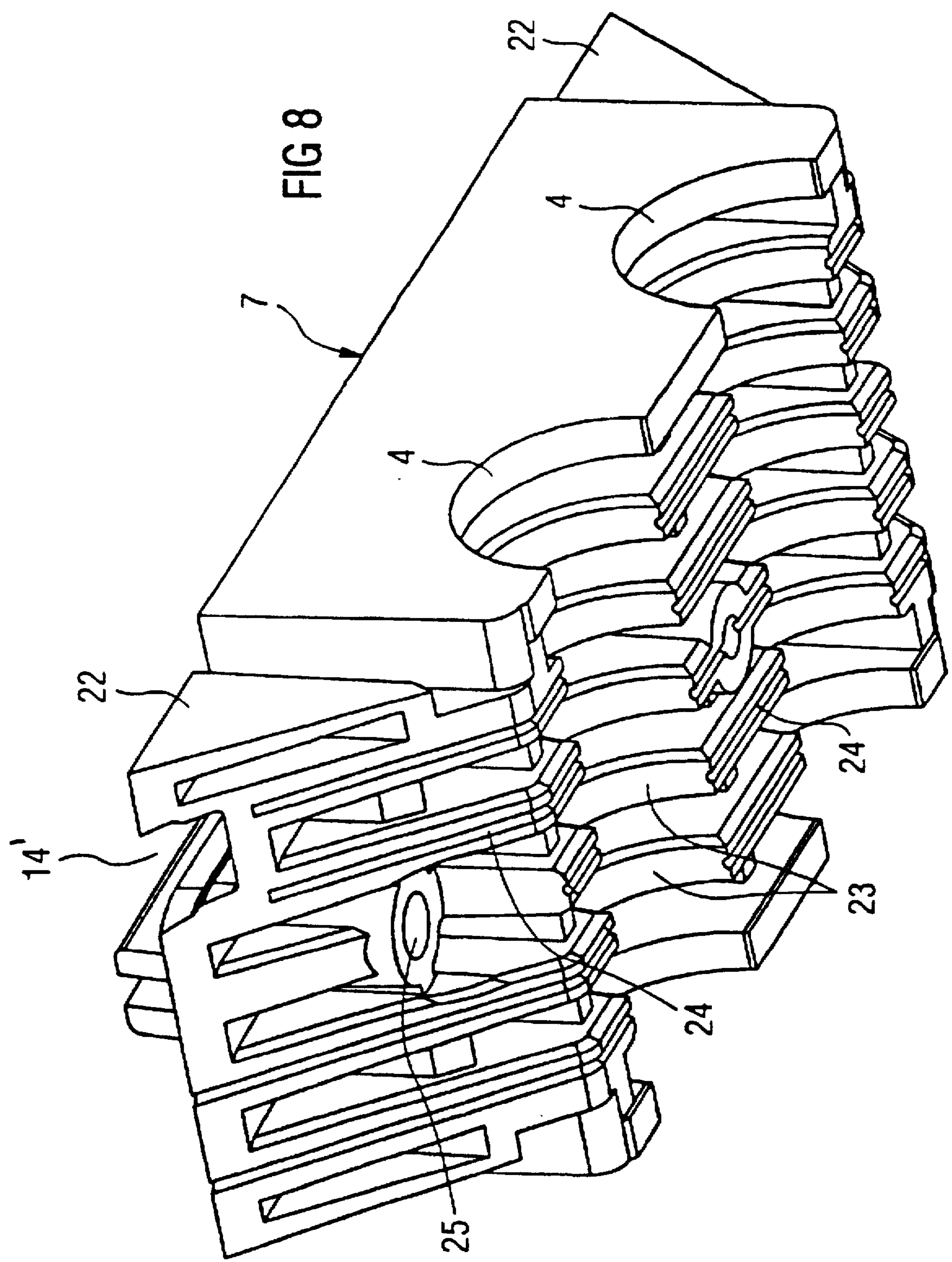
FIG. 8 is a perspective view showing a lower surface of the sealing element of FIG. 7.

As illustrated in FIGS. 7 and 8, the sealing element 7 has half-cable lead-in openings 4. Side walls 23 of the sealing element taper in a wedge-like manner and are likewise designed in a lamella form, so that here, too, the same sealing condition prevails as in the cable lead-in region. What is more, there are additional displacement grooves 24 in the lamellae 23. Also provided in the end faces of the sealing element 7 are grooves 67, into which are engaged angled portions or flanges 7a (FIG. 2) of the outer and inner lamellae 69 of the lower shell 2, which lamellae form the chamber 13. In this way, a means of torsionally securing the sealing element 7 in the chamber 13 of the lower shell is obtained. It is also made possible with a reliable guidance of the sealing element 7 during fitting together of the parts. In addition, prevention against turning the wrong way around or inserting the insert 7 backwards can be provided, for example, by having the sealing element only provided with three grooves 67 in which only three angled portions, such as 7a, of the lower shell 2 correspondingly are engaged. An additional strip 26 on the upper face 7b of the sealing element 7 permits by corresponding formations additional possibilities for arresting fastenings and the like. In addition, there is an opening 25 for the tapping screws. Furthermore, the part of the peripheral seal groove 14' running in the sealing element can be seen in FIG. 7. Also, the region of the sealing element may have an additional attached fixing element 27, in or on which required organizing elements may be attached.

The lamellae 23 around the openings 4 are best illustrated in FIG. 8. In the bearing region toward the lower shell, the lamellae are additionally provided with displacement grooves 24. In addition, the wedge-shaped design of the sealing element is clearly evident and the lateral triangular region or portion 22, which is led into the chamber 13 of the lower shell 2, is clearly evident.

Figure 9:
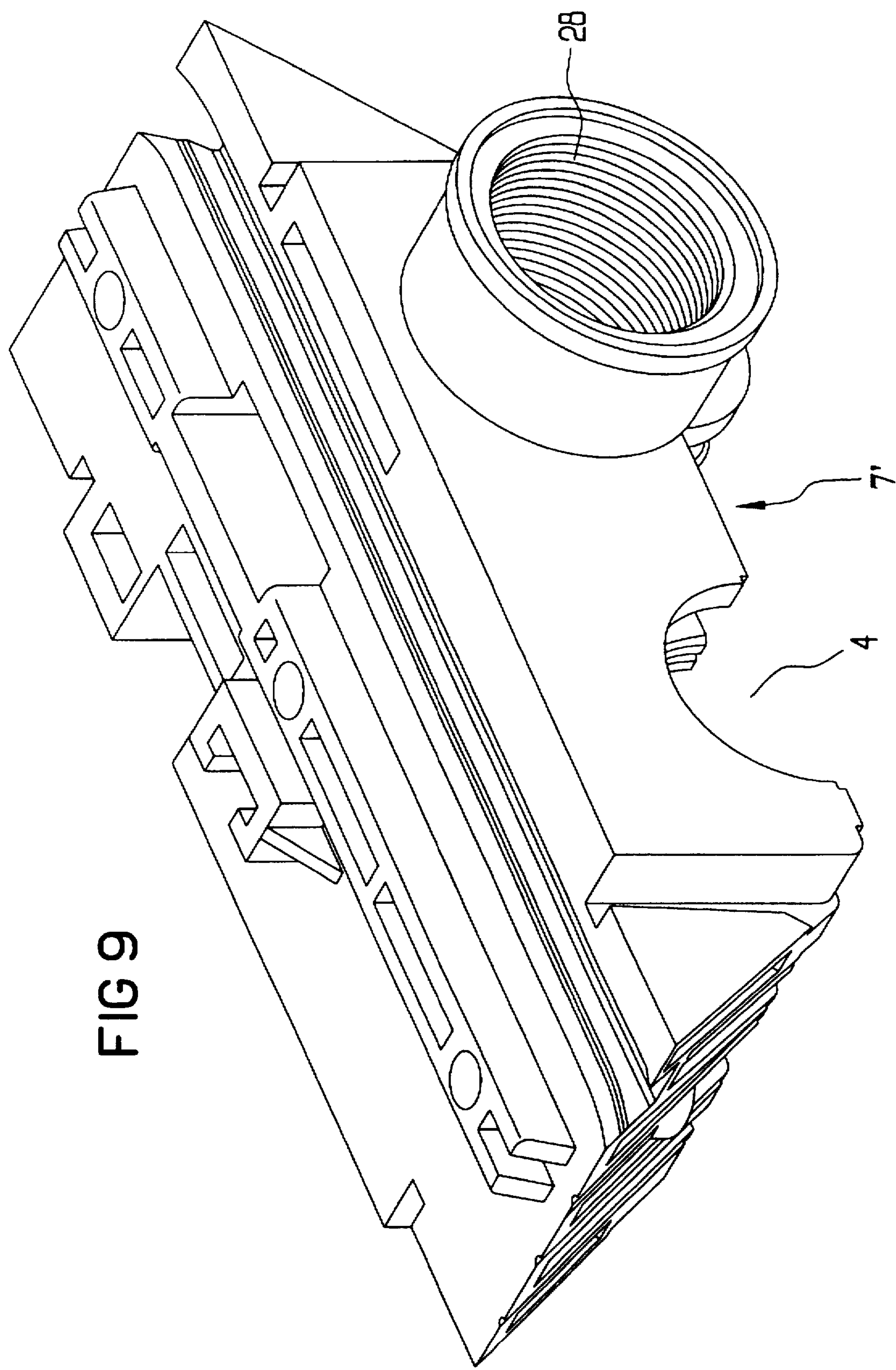
FIG. 9 is a perspective view of a modification of the sealing element having a sealing gland.

A modification of the sealing element is illustrated at 7' in FIG. 9. The sealing element 7' has a normal cable lead-in opening 4. In addition, it has a fixed, molded-in gland 28. It is ensured by this measure with the gland that a cable can be led-in at a later time without the already-existing cable lead-in being damaged. The cable to be newly fed-in is led in through the lead-in opening of the gland 28 and sealed in a way known per se. Consequently, such a sealing element 7' is used if retrofitting or a new lead-in of a cable is likely at a later time.

Figure 10:
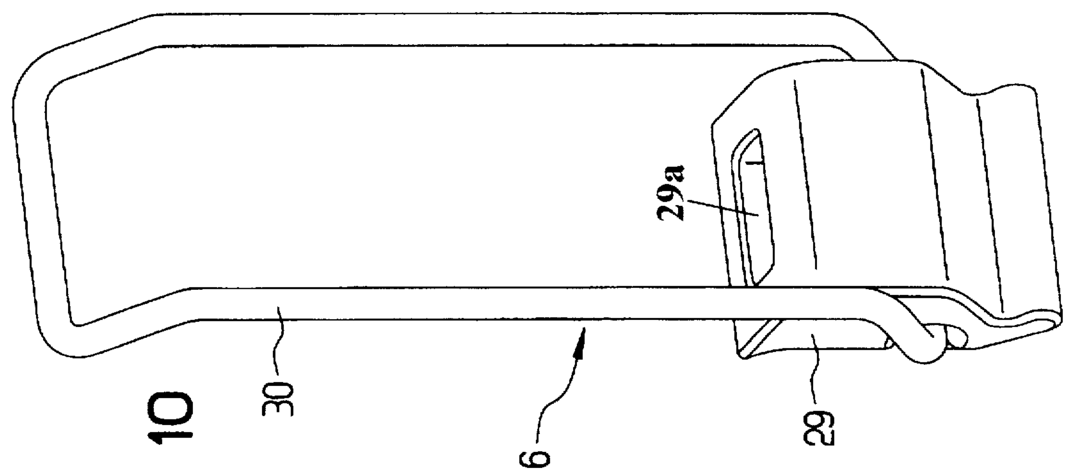
FIG. 10 is a perspective view of a fastening element in accordance with the present invention.

The fastening element 6 is shown in FIG. 10 and includes a clamping element 29, which is captively engaged in corresponding attachments in the side walls of the cable closure. When fastening, the loop end of the wire 30 is hooked into a corresponding attachment in the side wall of the cable closure, and the fastener is clamped in an engaging manner by means of the clamping element 29. The element 29 is provided with a slot or recess 29a, which can receive a tool, such as a screwdriver, to enable unlocking the fastening element. As illustrated in FIGS. 1 and 3, each of the fastening elements 6 has the wire 30 engaged or caught on hooks 17b of the lower shell 2, while the element 29 is received in the recess or depression 17a, as shown in FIG. 3. These elements 6 work with an over-center arrangement to clamp the cover 3 and the lower shell 2 together.

Figure 11:
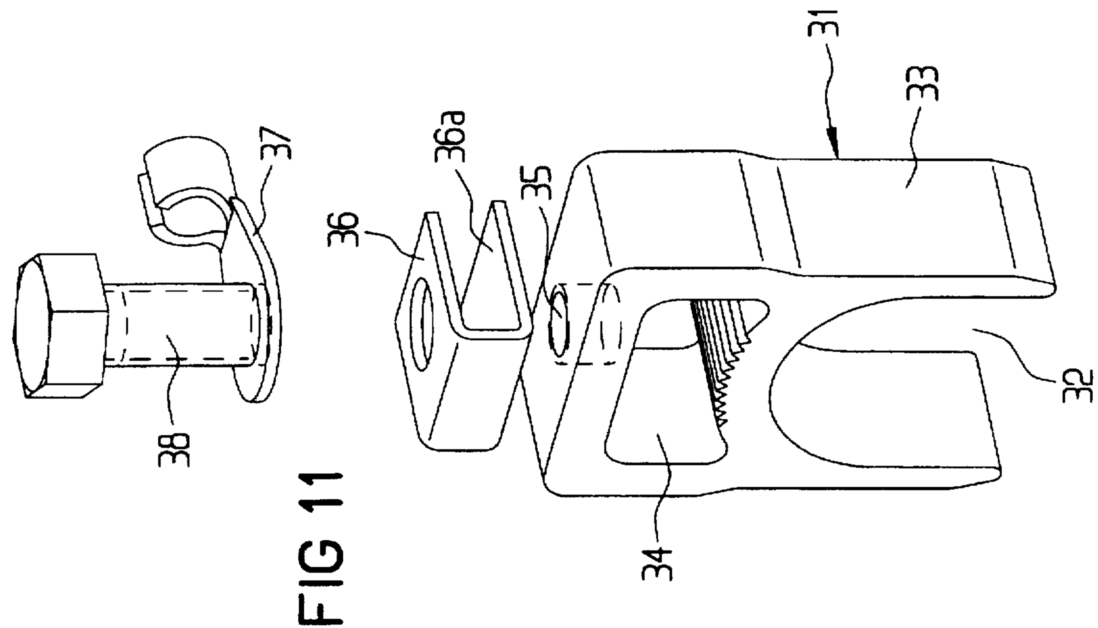
FIG. 11 is an exploded perspective view of a clamping device for clamping the cable sheath lugs.
Figure 12:
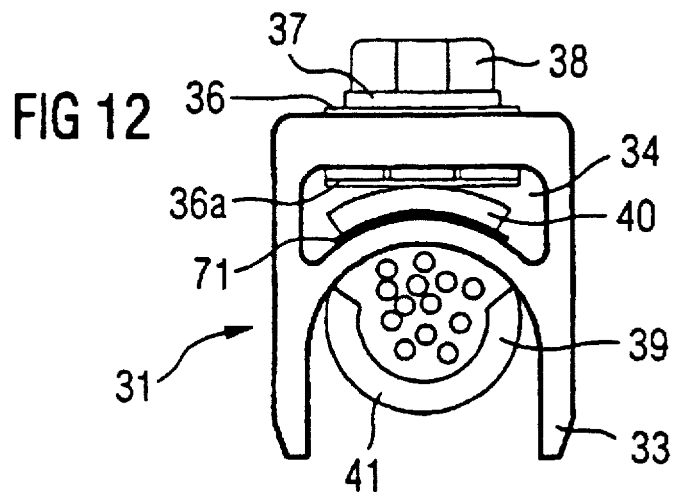
FIG. 12 is an end view of the clamping device of FIG. 11 engaged on a cable.

A cable sheath clamping device, generally indicated at 31 in FIG. 11, is for copper and optical fiber cables with integrated screen-contacting. With this clamping device 31, a mechanical load, such as tension, shear or torsion, can be absorbed and the electrical contacting of the cable screen is also possible. The component concerned is, for example, a metallic conducting component, by which the cable screen can be contacted and mechanical forces can be absorbed at the same time. During installation, the cable sheath 39 is cut into two longitudinal cuts, so that a cable sheath lug, such as 40 in FIG. 12, is formed. The cable sheath lug 40 is threaded into an upper opening 34 of the clamping device 31. By tightening the screw 38, the cable sheath is clamped by means of a pressure-exerting element 36. To do so, the pressure-exerting element 36 is designed in a U-shaped manner and is inserted with a pressure-exerting plate 36a into the slot 34. The screw 38 is fed through the opening of the second leg of the pressure-exerting element 36 and screwed into the threaded bore 35 until the pressure-exerting plate 36a is adequately clamping the cable sheath lug 40, which was inserted in the slot 34.

As illustrated in FIG. 11, a cable shoe or lug 37 is also mounted by the screw 38 to complete the electrical connection. The clamping device 31 is inserted with its two legs 33 into the corresponding receiving chamber 10 of the lower shell 2, so that the cable is led through the opening 32 formed between the legs 33. Instead of the molded-on raised points, contacting is also possible by pushing underneath a contact plate which is provided with slits. When the clamping screw 38 is tightened, these slits press into the aluminum screen of the cable. The screen connecting to the outside is likewise made by means of overhead wire under a clamping screw 38 or by the wire which is fitted directly onto the integrated tab on the contact plate by means of a cable shoe or connector 37, or is soldered directly onto the contact plate. In the case of the design with the contact plate or if the pressure-exerting element 36 is made of metal, the clamping part 31 may also be made of plastic.

As best shown in FIG. 12, the clamping part or device 31 is in the installed state, and the contact plate 71 is used here for contacting the cable screen. Moreover, it can be seen from this that the cable sheath is cut with two longitudinal cuts and forms the cable lug 40, which is inserted in the slot 34 and is clamped with the aid of the pressure-exerting plate 36a of the pressure-exerting element 36. In addition, here, too, there is inserted a cable shoe or connector 37, on which the screen-contacting can be performed if the inserted contact plate 71 is omitted. Between the two legs 33 of the clamping device 31, the cable is led through with its remaining portion 41 of the sheath 39.

Figure 13:
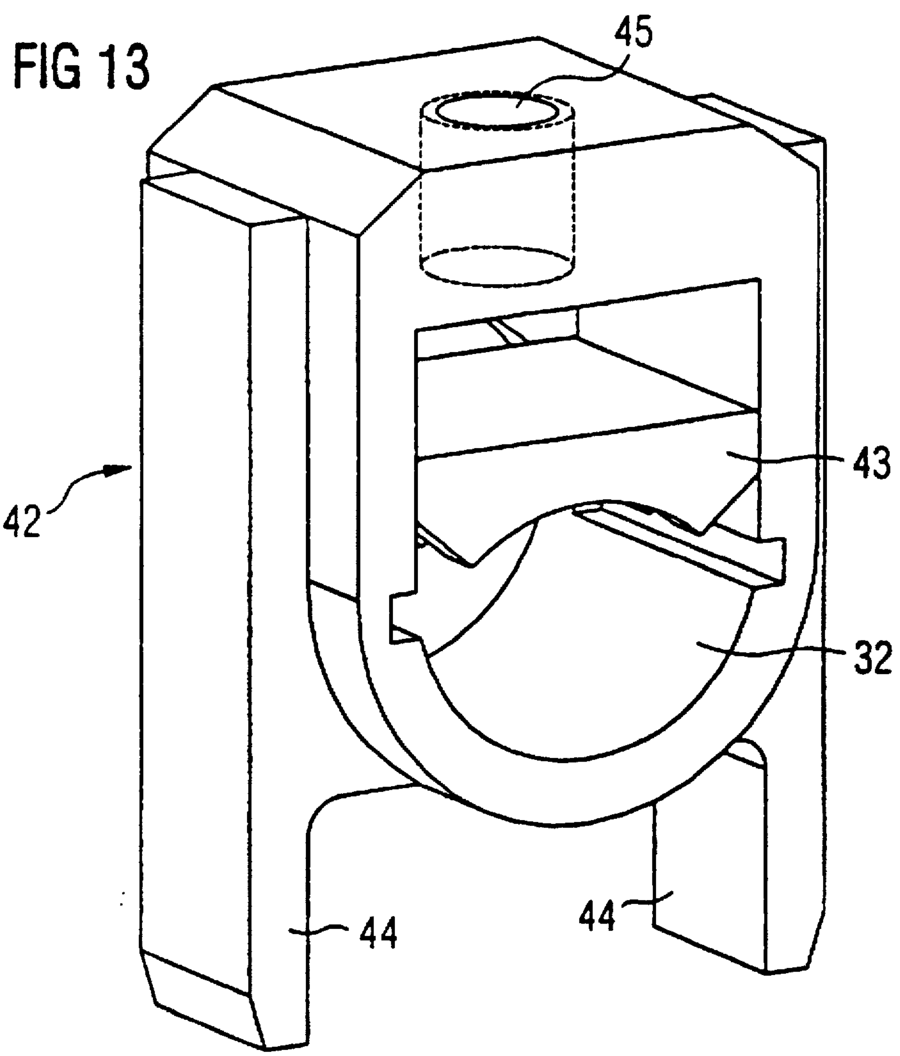
FIG. 13 is a perspective view of a modification of a single cable-clamping device.

A modification of the clamping device is shown by the device 42 in FIG. 13, although the clamping takes place here over the entire circumference of the cable sheath with the aid of a pressure element 43. The cable inserted into the lead-in through-opening 32 is consequently fixed almost all-around. Lateral grooves enhance the gripping characteristics and improve the torsional resistance. A pressure screw is threaded into an opening 45, provided with threads. The two legs 44 carry out the fixing in the receiving chamber 10 of the lower shell.

Figure 14:
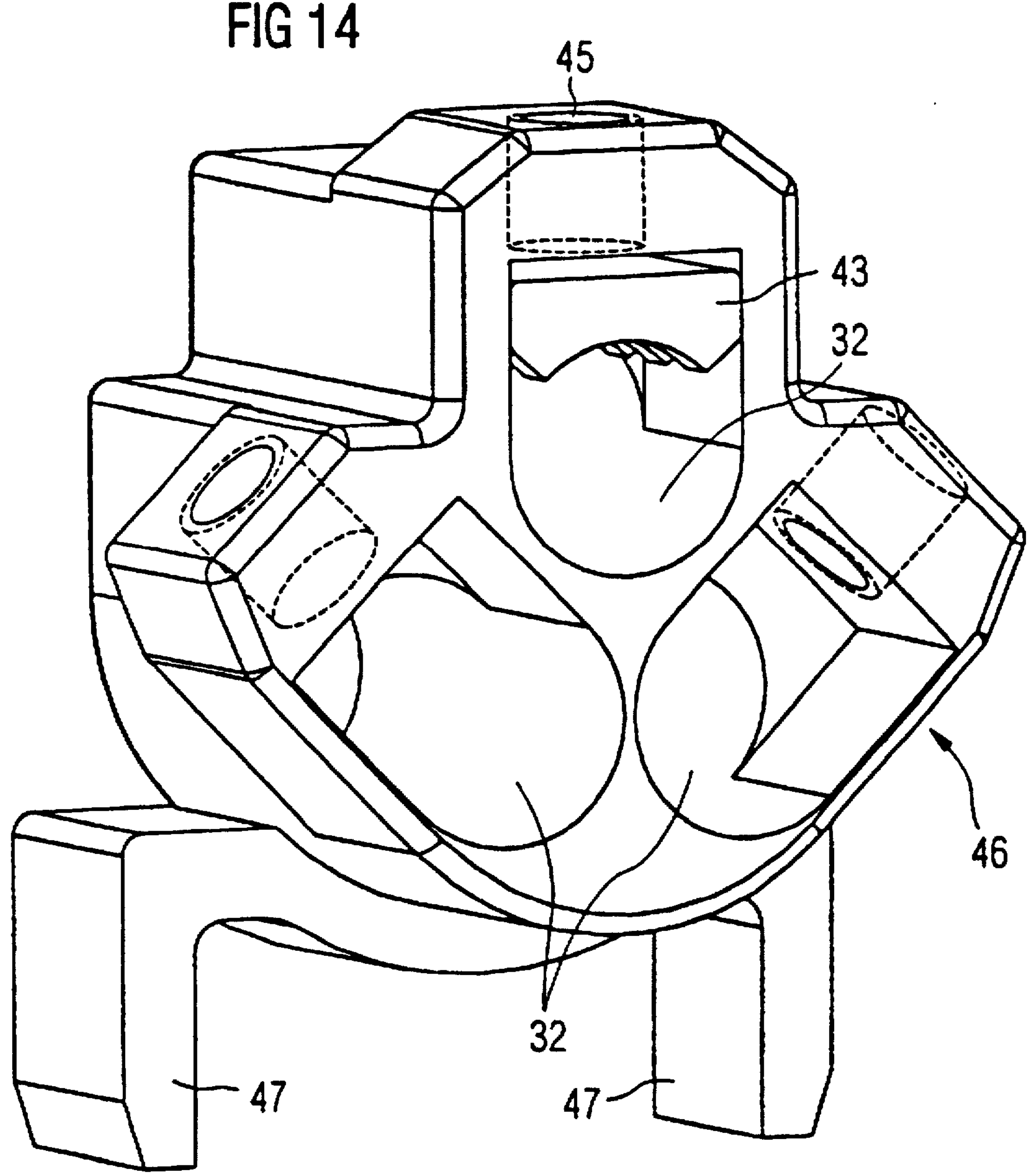
FIG. 14 is a perspective view of a triple cable-clamping device.

While the clamping devices 31 and 42 were for a single cable, a three-cable clamping device 46 is illustrated in FIG. 14. In this embodiment, the cable sheaths are clamped on the basis of a principle, which is indicated by the device 42 of FIG. 13. Nevertheless, other clamping possibilities are possible in the case of this arrangement. With the legs 47, the clamping element 46 may likewise be mounted into the clamping chamber 10 of the lower shell 2.

Figure 15:
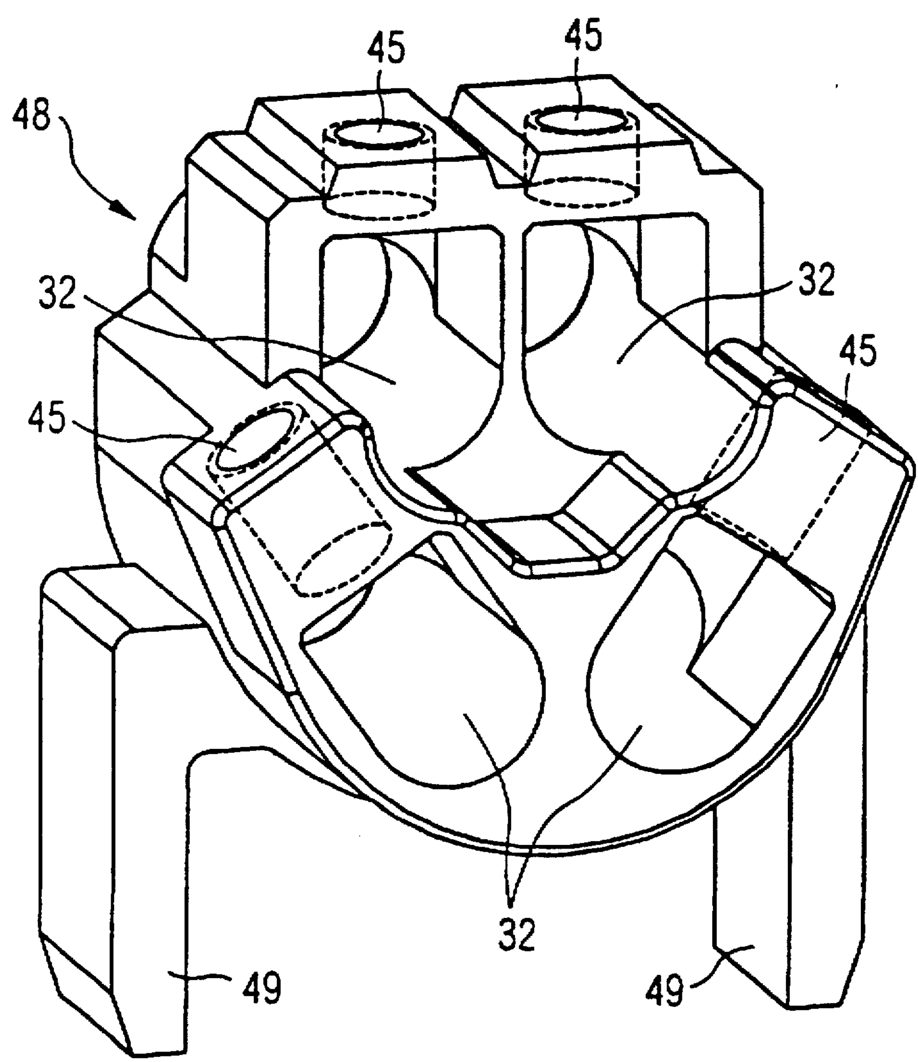
FIG. 15 is a perspective view of a quadruple cable-clamping device.

Yet another embodiment of the clamping device is indicated at 48 in FIG. 15, and is for clamping four cables in the through lead-in openings 32. The clamping takes place as before. To ensure reliable handling, the pressure elements with the threaded bores 45 are offset in pairs in the longitudinal direction. This clamping device 48 is likewise fixed with the aid of the legs 49 into the receiving chamber 10 of the lower shell 2.

Figure 16:
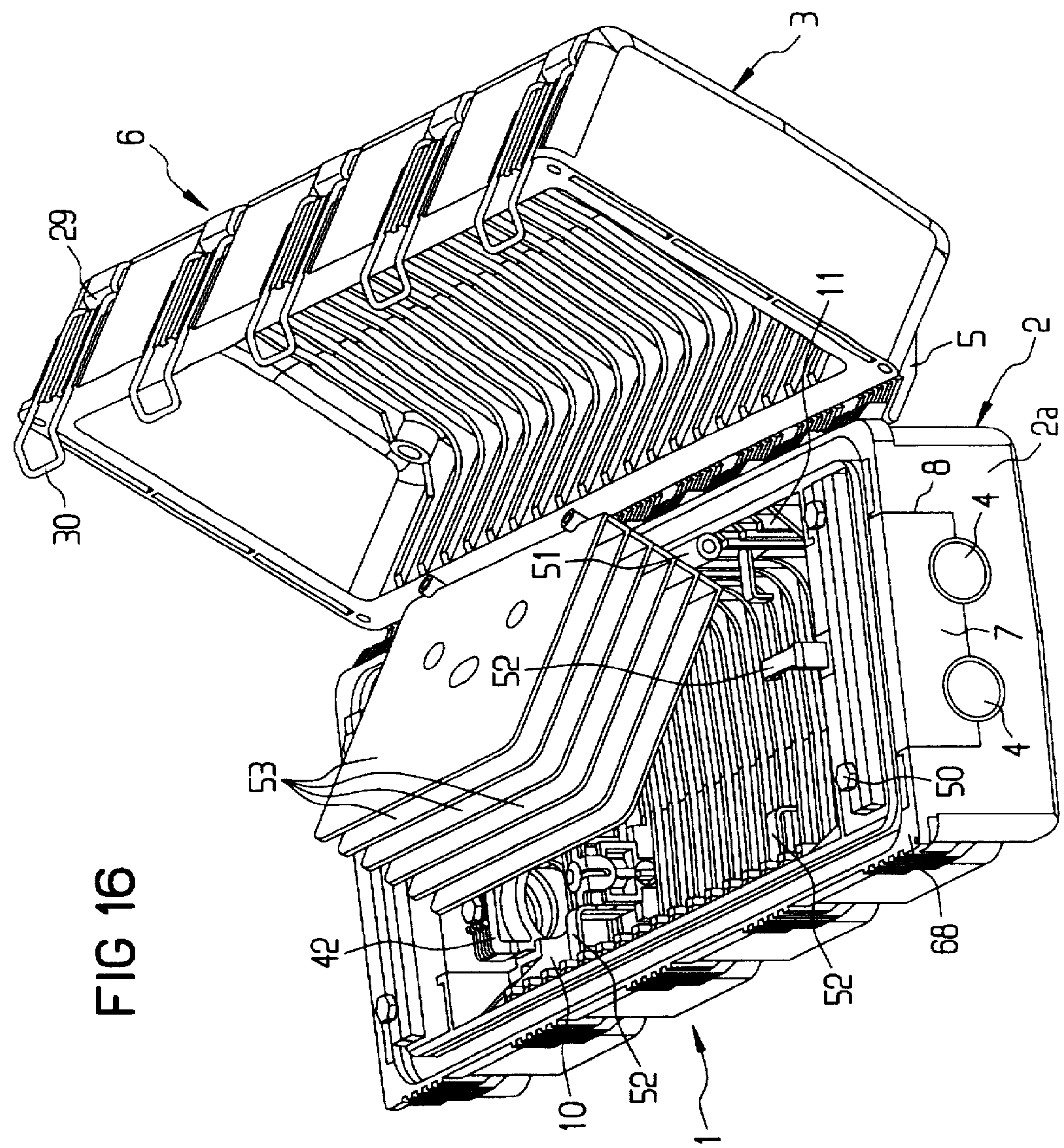
FIG. 16 is a perspective view of the cable closure in an opened position with an optical fiber organizer inserted therein.

In FIG. 16, a cable closure 1 which is equipped for receiving optical fiber cables is provided with a corresponding splice organizer. In this case, the lower shell 2 is provided, respectively, in the end faces with sealing elements 7, which have cable lead-in openings 4, which are arranged along the separating plane 8 between the sealing element 7 and the end face of the lower shell 2. The sealing element 7 is fixed in the lower shell with the aid of tapping screws 50. It can also be seen in the rear part of the lower shell 2 that a clamping element 42 is fitted in a receiving chamber 10. By means of the hinge 5, the cover 3 is connected so that it can be swung relative to the lower shell 2. It is also clearly evident that the fastening elements 6 are captively engaged in the attachment of the cover 3. After the cable closure has been closed, the wire loops 30 are engaged on the corresponding attachments or hooks of the lower shell and clamped by the clamping element 29. Provision of this equipment is to be regarded as the basic equipment and adequate for the leading-in and splicing of copper cables.

For use with optical fiber cables, this cable closure 1, according to the invention, can then be supplemented and optimized for the requirements of splicing optical fiber cables without changing the basic equipment. For example, in the case of this exemplary embodiment, a free space for depositing excess lengths of optical waveguides was created in the lower shell 2 by inserting optical waveguide hold-down devices 52. These optical hold-down devices 52 are designed as U-shaped angles, which are fixed with one leg in the undercut groove of the lower shell and with the second leg preventing the placed-in excess lengths of the optical waveguide from springing out upwardly. In this way, the excess lengths of the optical waveguide can be kept in the lower free space of the lower shell 2 of the cable closure in a clearly arranged way. It is also shown that the organizer holder 72 of FIG. 17 with a plurality of compartmentalizing plates 53 is arranged in the closure so that the plates 53 can be pivoted. The optical fiber splice organizers can then be placed into the individual compartments between the compartmentalizing plates 53, so that each splice organizers can be removed by itself in the case of service work. This organizer holder with the compartmentalizing plates 53 is also pivotable, so that it can be pivoted into the installation position, which is favorable in each case. By means of appropriate joints 51 and with the aid of plug-in continuations 54 (FIG. 17), the organizer holder with the compartmentalizing plates 53 is pushed into the undercut grooves 11, which are arranged laterally in the lower shell, and the holder is fixed in this manner. If need be, the entire organizer holder 72 can be removed from the cable closure 1.

Figure 17:
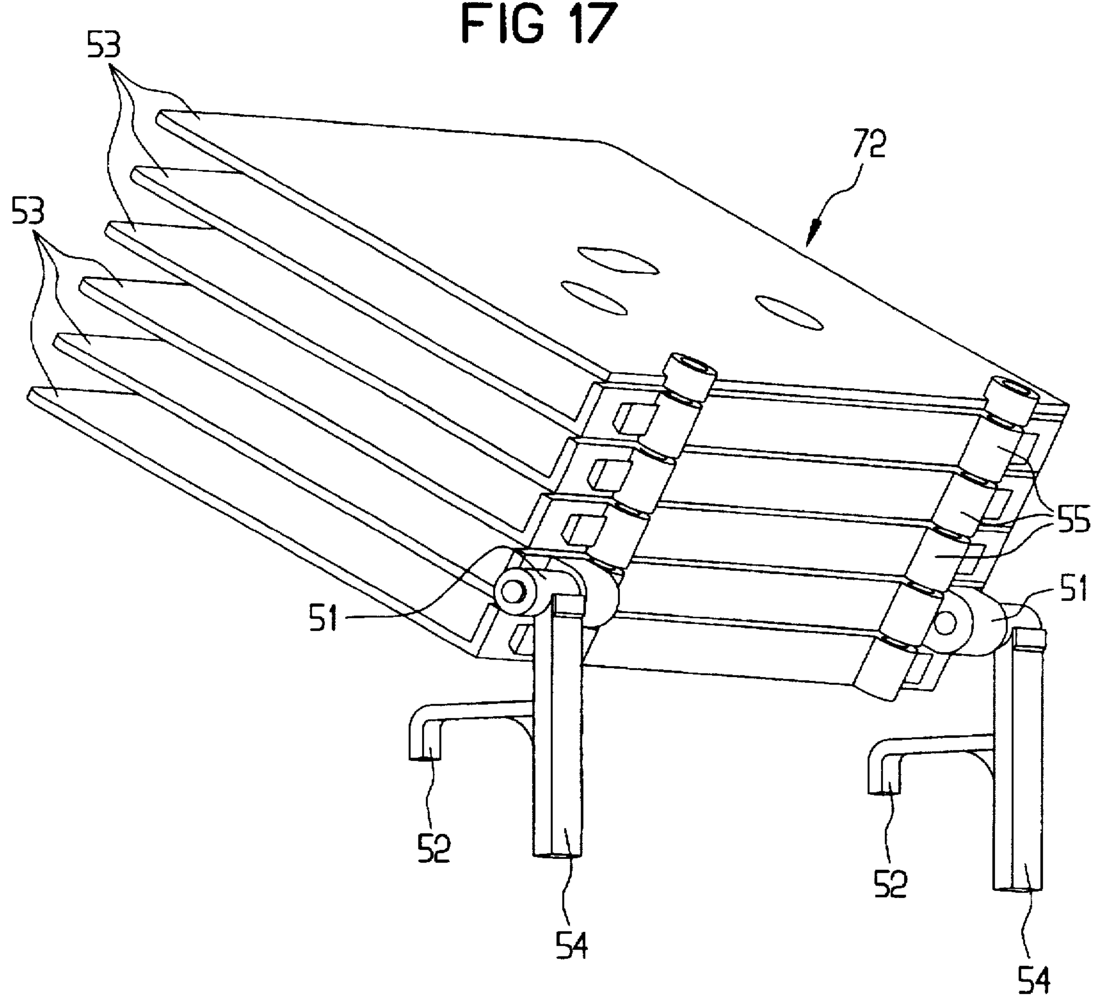
FIG. 17 is a perspective view of an organizer holder.

The organizer holder 72, when removed from the cable closure, is illustrated in FIG. 17, and is made up of a plurality of compartmentalizing plates 53, with each compartmentalizing plate 53 having plug-in sleeves 55. Thus, by pluggable fitting of the compartmentalizing plates 53 one on top of the other, the organizer holder can be adapted to the respective requirements. Attached to one of these plug-in sleeves 55 is ajoint 51 with plug-in continuations 54. These plug-in continuations 54 can, in turn, be pushed into the undercut grooves along the side walls of the lower shell 2. These plug-in continuations 54 can also be additionally provided with angled legs, which then serve as optical waveguide hold-down devices 52.

Figure 18:
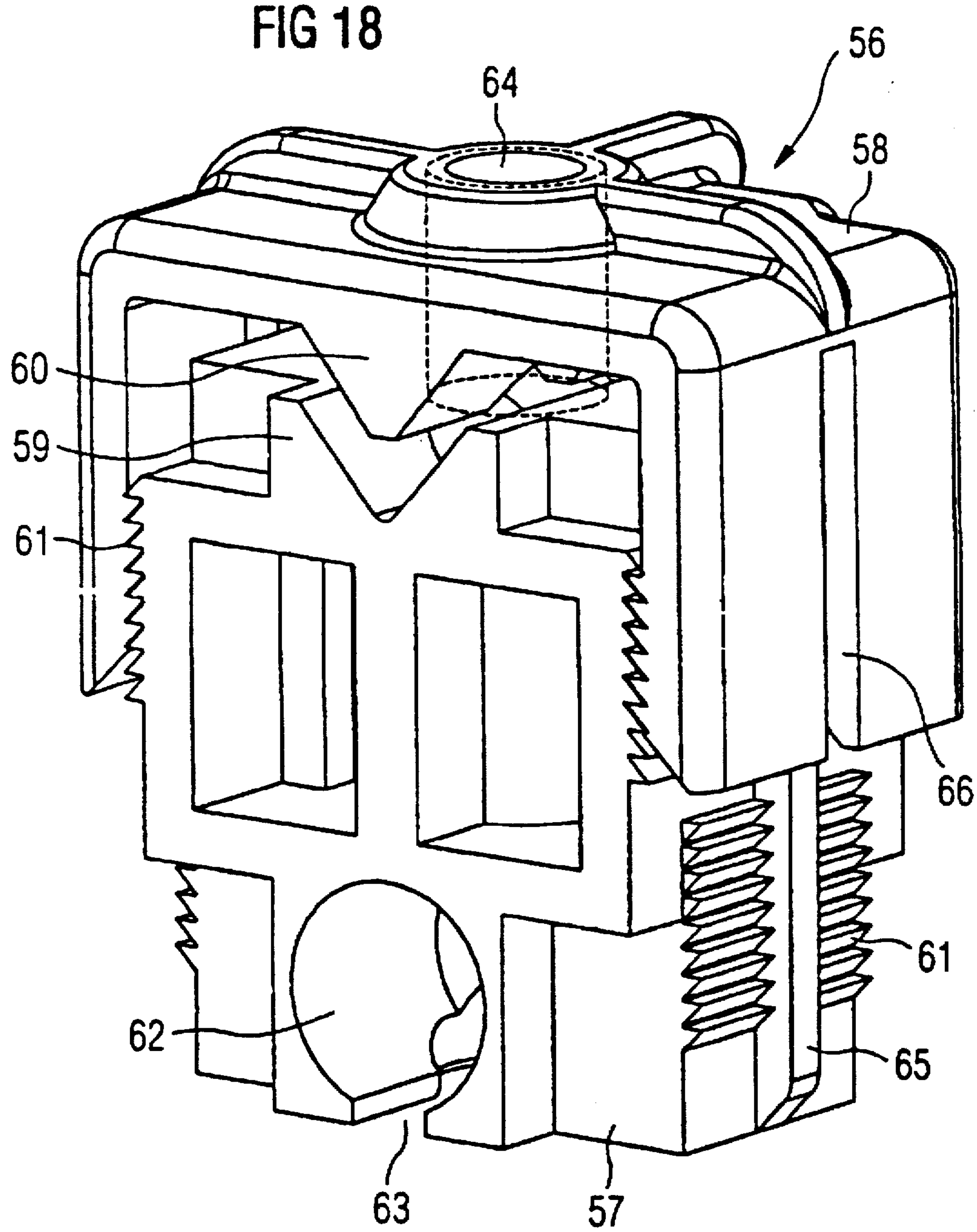
FIG. 18 is a modification of a clamping device for a central element of an optical fiber.

For clamping an optical fiber cable, a clamping device 56 of FIG. 18 is preferably utilized, and makes it possible for the clamping device to clamp rod-shaped center elements and receive the center pipes. The clamping device 56 comprises a basic module 57 and a clamping part 58. The basic module 57 has a V-shaped groove 59 at one end, in which the rod-shaped central elements of the optical fiber cable is clamped. The circular opening, such as 62, is provided with a slot 63 at the other end of the module 57 and serves for receiving the central pipes of the optical fiber cable. Depending on which type of central element is concerned, the basic module 57 is positioned in the appropriate position in one of the clamping chambers 10 or with the aid of tapping screws within the lower shell 3. Then, for clamping the respective central element, a U-shaped clamping part 58 is pushed over the basic module 57 and is fixed on account of the lateral corresponding engaging element 61, which form a ratchet-like arrangement. Arranged laterally on the basic module 57 are guide tongues, such as 65, which will engage in lateral guide grooves 66 of the clamping part 58 so that the clamping part 58 is also fixed in the longitudinal direction of the inserted central element. Molded on the interior of the clamping part 58 is a wedge 60, which corresponds to the contour of the V-shaped groove 59. With the aid of the clamping screw, which screw is through the lead opening 64, the central element inserted into the V-shaped groove 59 can be clamped. The same takes place when a tubular element is to be fixed in the opening 62. Then, the basic module 57 is turned through 180° and the part 58 is positioned over the slot 63.

Although various minor modifications may be suggested by those versed in the art, it should be understood that we wish to embody within the scope of the patent granted hereon all such modifications as reasonably and properly come within the scope of our contribution to the art.

We claim:

1. In a cable closure for receiving splices of a cable, said closure having a lower shell and a cover, at least one end face of the lower shell having a fixed part and a removable sealing, with cable lead-in openings being arranged in a separating plane between the fixed part and the sealing element, the improvements comprising the fixed part of the end face being formed by a plurality of rigid lamellae lying one behind the other in the axial direction of the cable lead-ins, the outermost and innermost lamellae forming a chamber for receiving a portion of the sealing element, said sealing element having lamellae facing the cable lead-in plane and corresponding to the lamellae of the lower shell, the sealing element being fixed in a recess of the fixed part of the end face in such a way that, after placing the sealing material in the separating plane between the fixed part and the sealing element, a peripherally stepless sealing plane is formed with respect to the cover, a receiving chamber for fixed cable-clamping means being arranged in the interior of the cable closure adjoining the fixed part of the lower shell, the cover being connected to the lower shell by means forming a hinge along one side of the cover and shell and fastening elements being arranged on an opposite side of the cover and shell.

2. In a cable closure according to claim 1, wherein the means for forming a hinge is formed by a plurality of individual attachment elements disposed along said one side of said shell and cover.

3. In a cable closure according to claim 1, wherein the means forming the hinge forms a separable hinge so that the cover can be removed from the lower shell.

4. In a cable closure according to claim 3, wherein one attachment for the means forming the hinge has a slot for receiving a spindle on a second attachment, the slot being narrower at its mouth to a distance which is less than the radius of the spindle of the second attachment.

5. In a cable closure according to claim 3, wherein the spindle has a flattened portion which allows removal and insertion through the narrow mouth of the slot.

6. In a cable closure according to claim 3, wherein corresponding attachments of a hinge are inserted into each other so that they are to be engaged.

7. In a cable closure according to claim 1, wherein a blind hole is arranged in the cover for lead-throughs.

8. In a cable closure according to claim 1, wherein side walls of the sealing elements taper in a wedge-shaped manner and the side walls of the chamber are adapted to this wedge shape.

9. In a cable closure according to claim 1, wherein the side walls in the interior of the lower shell are provided with ribs, which form undercut grooves.

10. In a cable closure according to claim 1, wherein attachments for receiving fastening elements are designed as depressions in the lower shell and in the cover.

11. In a cable closure according to claim 1, which includes dummy plugs for insertion in unused cable lead-in openings.

12. In a cable closure according to claim 1, wherein the lamellae of the lead-in opening and the lamellae of the side walls of the chamber and of the sealing element contain additional displacement grooves.

13. In a cable closure according to claim 1, wherein the sealing element, in an inner region, has additional strips for the fixing of fastening elements.

14. In a cable closure according to claim 1, wherein the sealing element has grooves for the engagement of angled portions formed in the innermost and outermost lamellae forming the chamber for receiving a portion of the sealing element.

15. In a cable closure according to claim 1, wherein the sealing element has a molded-on gland for receiving cables.

16. In a cable closure according to claim 1, wherein the fastening elements comprise a clamping element which can be captively engaged in a respective attachment of the cover and a wire clip which can be hooked onto a respective attachment in the lower shell.

17. In a cable closure according to claim 1, wherein a cable-clamping device has an opening for receiving and clamping a cable sheath lug by means of a pressure-exerting element.

18. In a cable closure according to claim 17, wherein the cable-clamping device has legs for being mounted in a receiving chamber in the lower shell.

19. In a cable closure according to claim 1, which includes cable-clamping means having movable pressure elements for clamping on the cable.

20. In a cable closure according to claim 1, which includes cable-clamping means having three lead-in openings in which pressure elements are arranged.

21. In a cable closure according to claim 1, which includes a cable-clamping device having four lead-in openings in which pressure elements are arranged.

22. In a cable closure according to claim 1, which includes optical waveguide hold-down devices designed as U-shaped angles having a first leg which is respectively fixed in an undercut groove by pushing in and a second leg which is angled-off downward as a retainer for excess lengths of optical waveguides in such a way that they form a lower free space in the lower shell for receiving excess lengths of the optical waveguides.

23. In a cable closure according to claim 1, which includes an organizer holder being arranged above a free space, said organizer holder being fixed with plug-in continuations in the undercut grooves of the lower shell.

24. In a cable closure according to claim 23, wherein the organizer holder comprises individual compartmentalizing plates between which optical fiber splice organizers are placed in an individual removable manner.

25. In a cable closure according to claim 24, wherein the compartmentalizing plates have plug-in sleeves with which the compartmentalizing plates can be stacked one on top of the other in a pluggable manner.

26. In a cable closure according to claim 1, which includes a clamping device for the central element of an optical fiber cable being arranged in a chamber of the lower shell.

27. In a cable closure according to claim 26, wherein the clamping device comprises a basic module and a clamping part which is designed in a U-shaped manner and can be engaged over said basic module in that the basic module and clamping part are connected to each other in an engaging manner, the basic module having a V-shaped groove for receiving a rod-shaped central element at one end and a circular opening with a slot for receiving a central pipe at the other end and in that the clamping of the central elements takes place with the aid of a pressure screw, which can be threaded into the V-shaped groove.

* * * * *